Patented Dec. 30, 1930

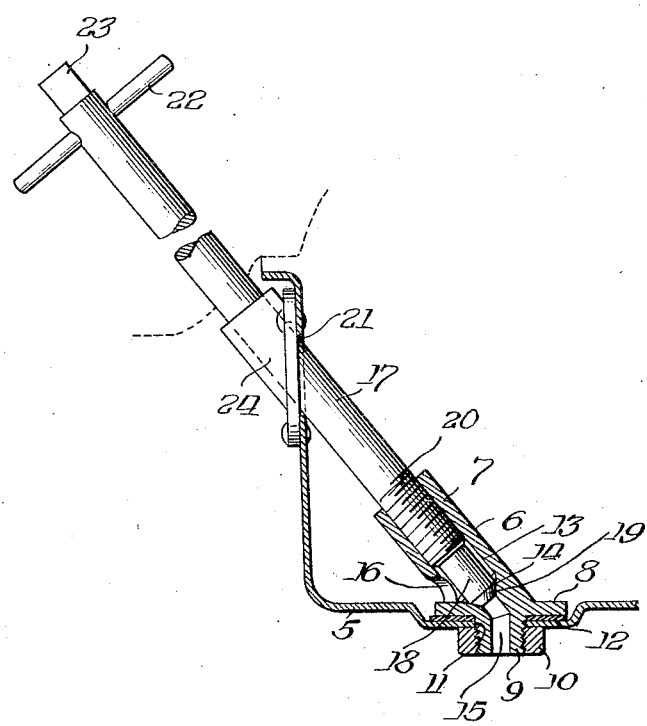

1,786,750

UNITED STATES PATENT OFFICE

ALBERT A. HASSELQUIST AND INGOLF H. M. ROGNLIE, OF ELGIN, ILLINOIS

VALVE

Application filed November 10, 1927. Serial No. 232,285.

This invention relates in general to valves and more particularly to valves for draining crank cases and other containers.

It has been customary in the past to provide automobile crank cases with plug valves for draining the same. Such valves have usually been situated in a more or less inaccessible place and were incapable of being operated from an accessible place making it necessary for one to get in a very inconvenient position to operate the valve or at least run the danger of soiling his clothes.

We are aware that valves have at least been patented which were intended to overcome the above objections but these have been more or less complicated in construction and not adapted to meet the rigid exigencies of the service required of such valves. Furthermore such valves have not been so constructed that they could be incorporated in the usual form of crank case without making radical changes in the valve or crank case which from the point of view of manufacture and operation would be impractical.

It is therefore the primary object of this invention to provide a valve for the above purpose which may be operated conveniently and without danger of soiling the clothes, which when closed will effectively seal the outlet for the oil and which is in no danger of working loose by vibration.

It is also an object of this invention to provide such a valve which is rugged and will therefore stand up under conditions of considerable stress.

It is further an object of this invention to provide a valve of the above character which is simple and convenient in manufacture and operation.

Another object of this invention is to provide a valve for the above purpose which may be readily incorporated in the usual form of crank case.

Other and further objects of this invention will be apparent as the same becomes better understood from an examination of the specification and claims in connection with the accompanying drawing wherein:

The drawing shows a vertical section with parts in elevation of a crank case of an automobile or the like embodying this invention.

Referring to the drawing more particularly numeral 5 designates a crank case of an engine. The crank case is adapted to contain oil and if the best results are to be obtained in the operation of the engine the oil must be frequently drained and renewed. Heretofore it has usually been necessary in order to drain the crank case to remove the plug threaded in the bottom thereof by getting underneath the car and applying a wrench to the plug. It might of course be possible for one to remove the plug by reaching under the crank case from above but by such a procedure he would run the danger of soiling his clothes.

In order to obviate the necessity of getting underneath the car to drain the oil or soiling the clothes by reaching underneath the crank case from above I provide a valve housing 6 including an inclined cylindrical portion 7, and a flange 8 at the bottom of said portion and lying at an angle of approximately 45° with respect thereto. The housing 6 is also provided with a depending portion 9 centrally located with respect to the flange 8 and at right angles thereto. The bottom of the case 5 is apertured as at 11 the portion 9 extending through said aperture. A nut 10 is threaded on the portion 9 and cooperates with the flange 8 to clamp the case 5 at the margins of said aperture for securing the housing 6. The portion 7 is longitudinally apertured as at 13 to form a valve chamber such aperture being concentric with respect to said portion and extending downwardly from the upper end thereof. The interior of the housing 6 at the bottom of the aperture 13 is shaped to form a valve seat 14 and a passage 15 leading from the center of said seat downwardly through the portion 9 to form an outlet for the oil. An inlet passage 16 is provided at the lower end of the portion 7 establishing communication between the exterior of the housing 6 and the interior thereof above the seat 14.

An elongated stem 17 in alignment with the portion 7 of the valve housing is provided with an integral valve closure or plug in the form of a reduced cylindrical portion 18 at its lower end. The portion 18 is beveled at its lower end to provide a seat 19 adapted to cooperate with the seat 14. The stem 17 is provided with a series of threads 20 above the reduced portion 18 which cooperate with suitable threads formed on the interior of the housing 6.

The stem 17 extends diagonally out of the case 5 through a suitable aperture 21 therein and is provided at its upper end with means for facilitating turning the stem for screwing the valve to or from closed position. The means for facilitating turning of the stem may take the form of a cross piece or handle 22, a flat sided portion 23 for the reception of a wrench or both as shown.

A bearing fixture 24 may be attached to the case 5 outside of the aperture 21 and in register with said aperture for sealing the same and forming a bearing for the stem 17.

The stem 17 extends to a position whereby the valve may be closed very conveniently and is provided with means for facilitating the turning of said stem as in the first embodiment.

We are aware that many changes may be made and many details varied without departing from the principles of this invention and we therefore do not wish to be limited to the details shown and described.

We claim:

1. In combination with a crank case adapted to contain an oil bath and provided with an outlet opening on its bottom surface a substantial distance from the side wall of the case, a valve housing secured to the case and disposed over said opening for controlling the flow therethrough, the housing being provided with a passage in register with the opening, a valve seat in said passage inside of the crank case, a valve closure member threaded in said housing and adapted to cooperate with said seat when in inwardly threaded position to close said passage, and an extension on said closure member protruding upwardly through a side wall of the crank case whereby the same may be conveniently threaded to and from closed position from a position remote from said opening.

2. In combination with a container provided with an outlet opening on its bottom surface a substantial distance from the side wall of the case, a valve housing secured to the container and disposed over said opening for controlling the flow therethrough, the housing being provided with a passage in register with the opening, a valve seat in said passage, a plug threaded in said housing and adapted to cooperate with said seat when in inwardly threaded position to close said passage, and means extending through a side wall of the case whereby the plug may be conveniently threaded to and from closed position from a position remote from said opening.

3. In combination with a container having a side wall and a bottom surface, a port in said bottom surface at a substantial distance from the side wall, a valve seat housing disposed in part in said port having a passage leading from the interior of the container through said housing and said port to the exterior of the container, said housing having a flange adapted to engage the interior of the container adjacent said port, clamping means external of the container for engaging the portion of the housing which protrudes through said port to clamp the housing in sealed engagement with the margins of said port, said valve seat being disposed within the housing inside the container, a valve for regulatably closing said passage, and means extending through a side wall of the container into the container threadily engaged with said housing for operating said valve.

In witness of the foregoing we affix our signatures.

ALBERT A. HASSELQUIST.
INGOLF H. M. ROGNLIE.